US008838782B2

(12) United States Patent
Yasuda et al.

(10) Patent No.: US 8,838,782 B2
(45) Date of Patent: Sep. 16, 2014

(54) NETWORK PROTOCOL PROCESSING SYSTEM AND NETWORK PROTOCOL PROCESSING METHOD

(75) Inventors: Masato Yasuda, Tokyo (JP); Kiyohisa Ichino, Tokyo (JP)

(73) Assignee: NEC Corporation, Tokyo (JP)

( * ) Notice: Subject to any disclaimer, the term of this patent is extended or adjusted under 35 U.S.C. 154(b) by 810 days.

(21) Appl. No.: 13/119,782

(22) PCT Filed: Jul. 2, 2009

(86) PCT No.: PCT/JP2009/062086
§ 371 (c)(1),
(2), (4) Date: Jul. 6, 2011

(87) PCT Pub. No.: WO2010/032533
PCT Pub. Date: Mar. 25, 2010

(65) Prior Publication Data
US 2011/0270976 A1 Nov. 3, 2011

(30) Foreign Application Priority Data
Sep. 19, 2008 (JP) ................................. 2008-241816

(51) Int. Cl.
*G06F 15/173* (2006.01)
*H04L 12/801* (2013.01)
*H04L 29/06* (2006.01)
*H04L 12/851* (2013.01)
*H04L 12/911* (2013.01)
*H04L 12/805* (2013.01)

(52) U.S. Cl.
CPC .............. *H04L 69/16* (2013.01); *H04L 47/193* (2013.01); *H04L 47/821* (2013.01); *H04L 47/10* (2013.01); *H04L 47/36* (2013.01); *H04L 47/2441* (2013.01); *H04L 69/163* (2013.01)

USPC ........... 709/224; 709/213; 709/214; 709/215; 709/220; 709/223; 709/225; 709/226; 709/227; 709/228; 709/229; 709/230; 709/231; 709/235; 709/238; 709/245; 709/249; 709/250; 370/235; 370/412; 710/22; 710/23; 710/28; 710/33; 710/34; 710/35; 710/36; 710/39; 710/52; 710/112; 710/305; 710/308; 710/310

(58) Field of Classification Search
CPC ..... H04L 69/16; H04L 69/163; H04L 69/161; H04L 69/165; H04L 69/169; H04L 69/168; H04L 47/193; H04L 47/10; H04L 49/90; H04L 69/12; H04L 49/901; H04L 69/08; H04L 69/166; H04L 69/22; H04L 65/608
USPC ......... 709/213, 214, 215, 220, 223, 224, 225, 709/226, 227, 228, 229, 230, 231, 235, 238, 709/245, 249, 250; 370/235, 412; 710/22, 710/23, 28, 33, 34, 35, 36, 39, 52, 112, 305, 710/308, 310
See application file for complete search history.

(56) References Cited

U.S. PATENT DOCUMENTS

| | | | | |
|---|---|---|---|---|
| 5,872,919 | A * | 2/1999 | Wakeland | 709/230 |
| 6,590,885 | B1 * | 7/2003 | Jorgensen | 370/338 |
| 6,772,211 | B2 * | 8/2004 | Lu et al. | 709/226 |
| 7,167,927 | B2 * | 1/2007 | Philbrick et al. | 709/250 |
| 7,228,422 | B2 * | 6/2007 | Morioka et al. | 713/171 |
| 7,287,092 | B2 * | 10/2007 | Sharp | 709/245 |
| 7,409,450 | B2 * | 8/2008 | Jorgensen | 709/226 |
| 7,464,180 | B1 * | 12/2008 | Jacobs et al. | 709/240 |
| 7,496,689 | B2 * | 2/2009 | Sharp et al. | 709/250 |
| 7,694,024 | B2 * | 4/2010 | Philbrick et al. | 709/250 |
| 8,379,524 | B1 * | 2/2013 | Jacobs et al. | 370/235.1 |
| 8,593,955 | B2 * | 11/2013 | Yano et al. | 370/230 |
| 2002/0095519 | A1 * | 7/2002 | Philbrick et al. | 709/250 |
| 2003/0081549 | A1 * | 5/2003 | Goetzinger et al. | 370/230.1 |
| 2004/0062245 | A1 * | 4/2004 | Sharp et al. | 370/392 |
| 2004/0208177 | A1 * | 10/2004 | Ogawa | 370/392 |
| 2005/0182841 | A1 * | 8/2005 | Sharp | 709/228 |
| 2005/0223133 | A1 * | 10/2005 | Sen et al. | 710/22 |
| 2005/0278459 | A1 * | 12/2005 | Boucher et al. | 709/250 |
| 2006/0112272 | A1 * | 5/2006 | Morioka et al. | 713/171 |
| 2006/0126640 | A1 * | 6/2006 | Sood et al. | 370/395.32 |
| 2006/0140121 | A1 * | 6/2006 | Kakani et al. | 370/235 |
| 2006/0262782 | A1 * | 11/2006 | Biran et al. | 370/389 |
| 2006/0274789 | A1 * | 12/2006 | Pong | 370/469 |

| | | | |
|---|---|---|---|
| 2007/0070906 A1* | 3/2007 | Thakur | 370/235 |
| 2007/0118665 A1* | 5/2007 | Philbrick et al. | 709/230 |
| 2007/0130356 A1* | 6/2007 | Boucher et al. | 709/230 |
| 2007/0136495 A1* | 6/2007 | Boucher et al. | 709/250 |
| 2007/0162981 A1* | 7/2007 | Morioka et al. | 726/30 |
| 2008/0071924 A1* | 3/2008 | Chilukoor | 709/240 |
| 2008/0107118 A1* | 5/2008 | Goetzinger et al. | 370/395.4 |
| 2008/0170501 A1* | 7/2008 | Patel et al. | 370/235 |
| 2008/0184273 A1* | 7/2008 | Sekar | 719/319 |
| 2008/0222352 A1* | 9/2008 | Booth et al. | 711/108 |
| 2008/0222479 A1* | 9/2008 | Banerjee et al. | 714/749 |
| 2009/0080332 A1* | 3/2009 | Mizrachi et al. | 370/236 |
| 2009/0217030 A1* | 8/2009 | Premkumar et al. | 713/153 |
| 2009/0241001 A1* | 9/2009 | Park et al. | 714/749 |
| 2009/0271512 A1* | 10/2009 | Jorgensen | 709/224 |

FOREIGN PATENT DOCUMENTS

| | | | |
|---|---|---|---|
| JP | 2000349856 A | 12/2000 |
| JP | 2003188914 A | 7/2003 |
| JP | 2007110483 A | 4/2007 |
| JP | 2007166294 A | 6/2007 |
| JP | 2008146486 A | 6/2008 |

OTHER PUBLICATIONS

International Search Report for PCT/JP2009/062086 mailed Oct. 6, 2009.

RFC793—Transmission Control Protocol, DARPA Internet Program, Protocol Specification, Sep. 1981, <http://www.faqs.org/rfcs/rfc793.html>.

S. Floyd et al., RFC3782—The NewReno Modification to TCP's Fast Recovery Algor, Network Working Group, 2004, <http://www.faqs.org/rfcs/rfc3782.html>.

* cited by examiner

*Primary Examiner* — Saket K Daftuar

(74) *Attorney, Agent, or Firm* — Sughrue Mion, PLLC

(57) ABSTRACT

In a network protocol processing system in which variables of each of TCP transmission processing and TCP reception processing depend on each other, asynchronous parallel processing is realized between a transmission processing block and a reception processing block for updated protocol processing. Specifically, the system includes a high priority queue for transferring control data to be processed with high priority, a low priority queue for control data other than the above control data, and priority control means for distributing the control data to two kinds of queues. When a request for session establishment and the session disconnection of a new TCP session is issued from an application during transmission of TCP data, data related with the session establishment and the session disconnection is notified preferentially through the high priority queue, and other control data is transferred through the low priority queue.

9 Claims, 11 Drawing Sheets

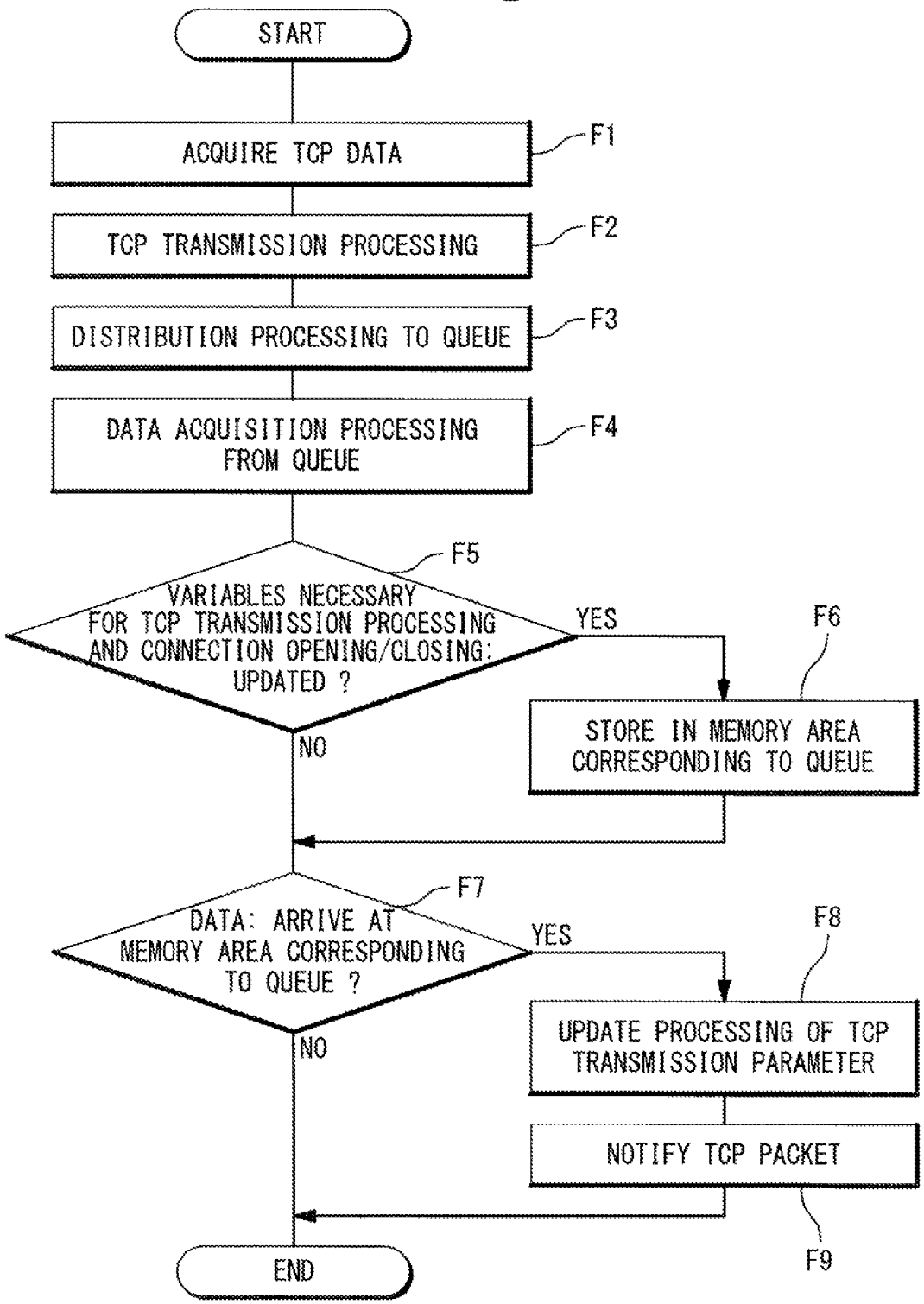

NETWORK PROTOCOL PROCESSING SYSTEM AND NETWORK PROTOCOL PROCESSING METHOD

TECHNICAL FIELD

The present invention relates to a network protocol processing system, and more particularly, to a network protocol processing system in which variables in processing of protocol such as TCP (Transmission Control Protocol) in a transmission processing and a reception processing depend on each other.

BACKGROUND ART

In a related network protocol processing system, pipeline processing is realized by a plurality of protocol processing sections. The related network protocol processing system contains sub processors for implementing the plurality of protocol processing sections, a first recording medium for storing protocol control data, and a second recording medium which can be accessed at a speed higher than the first recording medium. A first protocol processing section issues an instruction to read protocol data from the first recording medium to store in the second recording medium or to newly generate the protocol control data to store in the second recording medium. Also, a second protocol processing section refers to the protocol control data stored in the second recording medium to carries out protocol processing. The first protocol processing section carries out processing at a former stage than the second protocol processing section. Thus, a pipeline operation is realized.

However, the related network protocol processing system has the following problems.

The first problem lies in that the related network protocol processing system cannot realize asynchronous parallel processing between a transmission processing block and a reception processing block in the protocol processing. The reason is in that as an amount of control data transferred between the plurality of protocol processing sections, only one entry is prepared for each session.

The second problem lies in that even if a single queue is provided to store the control data transferred between the transmission processing block and the reception processing block in order to solve the first problem, the use of only the single queue degrades the performance of a session opening/closing processing during a data transmission/reception processing in a network. The reason is in that when all of the control data transferred between the transmission processing blocks and between the reception processing blocks pass through the same queue, the control data related to the session opening/closing processing between the transmission processing block and the reception processing block is influenced by control data transferred through packet processing.

The third problem lies in that data transfer performance of the session for a network protocol with a high priority level cannot be improved. The reason is in that a priority control for each session in the network protocol processing is not considered.

As a related technique, Japanese Patent Publication (JP 2008-146486A: Patent Literature 1) discloses a communication apparatus, a control method of a communication apparatus, and a program. In this related technique, a hierarchical protocol stack such as TCP/IP is processed in a pipeline manner by a plurality of processors.

Also, Japanese Patent Publication (JP 2007-166294A) (Patent Literature 2) discloses a packet transferring apparatus and a multicast expanding method. In this related technique, pointer data and priority data are distributed into either one of a low priority queue and a high priority queue in accordance with a specified priority.

CITATION LIST

[Patent Literature 1]: JP 2008-146486A
[Patent Literature 2]: JP 2007-166294A
[Non-Patent Literature 1]: RFC7933<http://www.faqs.org/rfcs/rfc793.html>
[Non-Patent Literature 2]: RFC3782<http://www.faqs.org/rfcs/rfc3782.html>

SUMMARY OF THE INVENTION

An object of the present invention is to provide a network protocol processing system, a network protocol processing method and a program, in which asynchronous parallel processing of transmission processing and reception processing is carried out in a network system that variables of protocol processing in the transmission processing and the reception processing for a network protocol such as with TCP (Transmission Control Protocol) depend on each other.

The network protocol processing system of the present invention includes a control data transferring unit, a TCP reception processing unit and a TCP transmission processing unit. The control data transferring unit carries out protocol processing in which protocol processing variables used in control data in each of the transmission processing and the reception processing based on the TCP (Transmission Control Protocol) protocol depend on each other. The TCP reception processing unit performs reception protocol processing on a reception packet arriving from a counter-side host. Also, the TCP reception processing unit sends the control data, which is used in the TCP transmission processing, of the control data updated through the reception protocol processing, to the control data transferring unit. Also, the TCP reception processing unit sends TCP data re-established through the reception protocol processing, to an application processing unit. The TCP transmission processing unit performs transmission protocol processing on transmission data for which a transmission request is issued from said application processing unit. Also, the TCP transmission processing unit sends the control data, which are used in the TCP reception processing, of the control data updated through the transmission protocol processing, to the control data transferring unit. Also, the TCP transmission processing unit sends a TCP packet generated through the transmission protocol processing, to the counter-side host.

The control data transferring unit stores the control data sent from the TCP reception processing unit in a first queue and stores the control data sent from the TCP transmission processing unit in a second queue. The TCP transmission processing unit monitors (inspects) the first queue, and if the control data is stored in the first queue, acquires the control data from the first queue and updates the variables of the TCP transmission processing. The TCP reception processing unit monitors the second queue, and if the control data is stored in the second queue, acquires the control data from the second queue and updates the variables of the reception processing of the TCP.

A network protocol processing method of the present invention is a method that is executed on a computer connected to the counter-side host. In this network protocol processing method, the protocol processing is carried out in which the protocol processing variables used in the control data in each of the transmission processing and the reception processing based on the TCP (Transmission Control Protocol) depend on each other. Also, the reception protocol processing is performed on the reception packet arriving from the counter-side host and the control data which is used in the TCP transmission processing of the control data updated through the reception protocol processing, is stored in the first queue and provides the TCP data re-established by the reception protocol processing to an application side. Also, the transmission protocol processing is performed on the transmission data whose transmission is requested by the application side and the control data which is used in the TCP reception processing, of the control data updated through the transmission protocol processing, is stored in the second queue and sends the TCP packet generated by the transmission protocol processing to the counter-side host. Also, the first queue is monitored, and if the control data is stored in the first queue, the control data is acquired from the first queue and the variables of the TCP transmission processing are updated. Also, the second queue is monitored, and if the control data is stored in the second queue, the control data is acquired from the second queue and updates the variable of the reception processing of the TCP.

A program of the present invention is a program for instructing the computer to execute the following operations. In accordance with this program, the computer carries out the protocol processing in which the protocol processing variables used in the control data in each of the transmission processing and the reception processing based on the TCP (Transmission Control Protocol) depend on each other. Also, in accordance with this program, the computer performs the reception protocol processing on the reception packet arriving from the counter-side host. Also, in accordance with this program, the computer stores the control data, which is used in the TCP transmission processing, of the control data updated through the reception protocol processing, in the first queue. Also, in accordance with this program, the computer provides the TCP data re-established by the reception protocol processing to the application side. Also, in accordance with this program, the computer performs the transmission protocol processing on the transmission data whose transmission is requested by the application side. Also, in accordance with this program, the computer stores the control data, which is used in the TCP reception processing, of the control data updated through the transmission protocol processing, in the second queue. Also, in accordance with this program, the computer sends the TCP packet generated by the transmission protocol processing to the counter-side host. Also, in accordance with this program, the computer monitors the first queue, and if the control data is stored in the first queue, fetches the control data from the first queue and updates the variable of the TCP transmission processing. Also, in accordance with this program, the computer monitors the second queue, and if the control data is stored in the second queue, fetches the control data from the second queue and updates the variable of the reception processing of the TCP. It should be noted that the program of the present invention can be stored in the recording medium.

The asynchronous parallel processing can be carried out between the TCP transmission processing unit and reception processing unit.

BRIEF DESCRIPTION OF THE DRAWINGS

FIG. 11 is a unit diagram showing an operation at a time of transmitting in the third exemplary embodiment of the present invention.

DESCRIPTION OF EXEMPLARY EMBODIMENTS

First Exemplary Embodiment

A first exemplary embodiment of the present invention will be described below with reference to the attached drawings.

Figure 1:
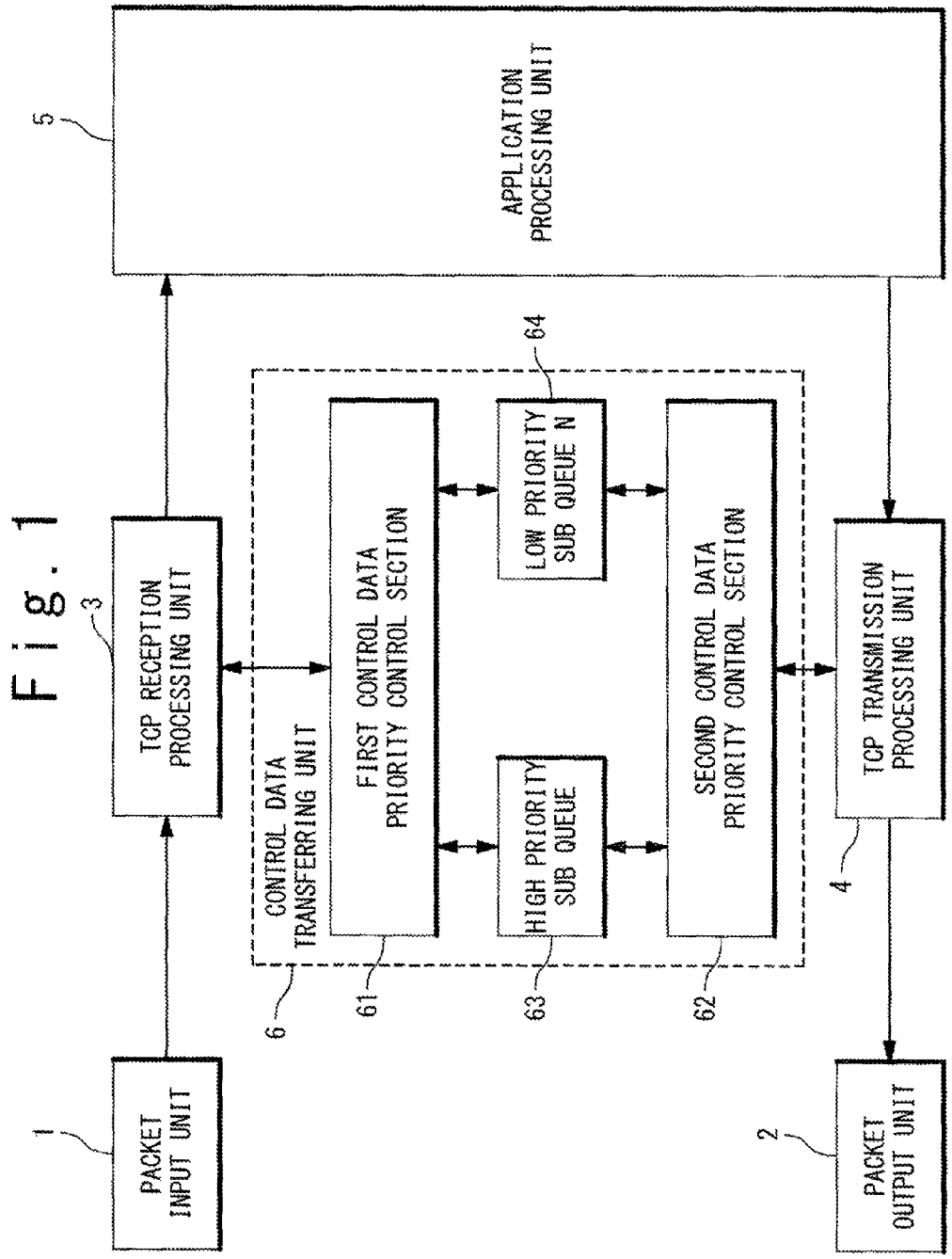
FIG. 1 is a unit diagram showing a configuration of a first exemplary embodiment of the present invention.

With reference to FIG. 1, a network protocol processing system in the first exemplary embodiment of the present invention is provided with a packet input unit 1, a packet output unit 2, a TCP (Transmission Control Protocol) reception processing unit 3, a TCP transmission processing unit 4, an application processing unit 5 and a control data transferring unit 6.

The packet input unit 1 receives packets that have arrived from a counter-side host. The packet output unit 2 sends packets to the counter-side host. The TCP reception processing unit 3 carries out TCP reception processing. The TCP transmission processing unit 4 carries out TCP transmission processing. The application processing unit 5 carries out processing of the TCP in a higher hierarchy layer of the network. Here, the application processing unit 5 executes an application (application software). The control data transferring unit 6 transfers control data between the TCP reception processing unit 3 and the TCP transmission processing unit 4.

The control data transferring unit 6 contains a first control data priority control section 61, a second control data priority control section 62, a high priority sub queue 63 and a low priority sub queue 64.

The first control data priority control section 61 distributes the control data sent from the TCP reception processing unit 3 into either one of the high priority sub queue 63 and the low priority sub queue 64 on the basis of a kind of the control data. Also, the first control data priority control section 61 checks whether the control data sent from the TCP transmission processing unit 4 has arrived at the high priority sub queue 63 or the low priority sub queue 64, and updates a responding internal processing variable of the TCP reception processing unit 3, if the control data has arrived.

The second control data priority control section 62 distributes the control data sent from the TCP transmission processing unit 4, into either one of the high priority sub queue 63 or the low priority sub queue 64, on the basis of a kind of the control data. Also, the second control data priority control section 62 checks whether the control data sent from the TCP reception processing unit 3 has arrived at the high priority sub queue 63 or the low priority sub queue 64, and updates a responding internal processing variable of the TCP transmission processing unit 4, if the control data has arrived.

Each of the high priority sub queue 63 and the low priority sub queue 64 contains a pair of a queue (first queue) for storing the control data from the TCP reception processing unit 3 to the TCP transmission processing unit 4 and a queue (second queue) for storing the control data from the TCP transmission processing unit 4 to the TCP reception processing unit 3. Also, the high priority sub queue 63 and the low priority sub queue 64 stores the control data that is transferred between the TCP reception processing unit 3 and the TCP transmission processing unit 4. The high priority sub queue 63 stores the control data with high priority. The low priority sub queue 64 stores data other than the above data (the control data with high priority). Here, the low priority sub queue 64 stores the data that is not stored in the high priority sub queue 63.

The operation in this exemplary embodiment will be described below in detail.

The receiving operation of the TCP is described with reference to FIG. 2.

(1) Step A1

The packet input unit 1 receives the TCP packets sent from the counter-side host and sends them to the TCP reception processing unit 3.

(2) Step A2

Through TCP reception packet processing, the TCP reception processing unit 3 determines an effective data length, and updates [rcv_next], [rcv_wnd], [rcv_up] and [snd_una] which are the TCP protocol processing variables and a congestion window. Here, the variables in the TCP protocol such as [rcv_next] are the values defined by RFC (Request For Comment) 793 <http://www.faqs.org/rfcs/rfc793.html>. The congestion window is the variable that is used in a congestion control method of [NewReno] such as RFC3782 <http://www.faqs.org/rfcs/rfc3782.html>. Here, those variables respond to the control data.

(3) Step A3

The TCP reception processing unit 3 checks whether or not there is the variable updated through the TCP reception packet processing.

(4) Step A4

If there is the updated variable, the TCP reception processing unit 3 sends the update data of the updated variable to the control data transferring unit 6. The variable [rcv_nxt] of the variables updated through the TCP reception packet processing is the variable necessary in the TCP transmission processing unit 4 for determination of whether or not an ACK packet is sent. The variable [snd_una] is the variable necessary in the TCP transmission processing unit 4 for determination of an ACK field of the sent TCP packet. The congestion window is the variable necessary in the TCP transmission processing unit 4 for determination of the sending window.

(5) Step A5

Also, if a sequence number of the TCP is within an effective range when [FIN] or [RST] is included in the TCP packet received from the counter-side host, the TCP reception processing unit 3 transits an internal state of the responding TCP session from [ESTABLISHED] to [CLOSE_WAIT] or [CLOSED].

(6) Step A6

When there is the state transition, the TCP reception processing unit 3 sends the control data (for example, a TCP state data after the update) associated with the TCP state transition to the control data transferring unit 6.

(7) Step A7

After that, the TCP reception processing unit 3 notifies the TCP processing result to the application processing unit 5 and completes the reception processing.

In succession, the TCP transmission processing will be described with reference to FIG. 3.

(1) Step B1

The application processing unit 5 sends the TCP data to the TCP transmission processing unit 4.

(2) Step B2

The TCP transmission processing unit 4 updates [snd_nxt], [snd_max] and [snd_wnd], which are the variables in a determination processing of sendable TCP data and the TCP transmission processing through the TCP transmission packet processing. It should be noted that the TCP variables such as [snd_nxt] are defined in RFC793. Here, those variables respond to the control data.

(3) Step B3

Also, the TCP transmission processing unit 4 checks whether or not there is the variable updated through the TCP transmission packet processing.

(4) Step B4

If there is the updated variable, the TCP transmission processing unit 4 sends the update data of the updated variable to the control data transferring unit 6. Of the variables updated by the TCP processing of the transmission data, the [snd_nxt] and the [snd_max] are the variables necessary in the TCP reception processing unit 3, because they are used in a determination of whether a re-transmission timer is set when the ACK packet is received.

(5) Step B5

Also, when a request from the application processing unit 5 is [SYN], [FIN], or [RST] or a connection establishment notice or a disconnection notice, the TCP transmission processing unit 4 transits the internal state of the TCP session from [CLOSED] to [SYN] or from [ESTABLISHED] to [FIN_WAIT_1].

(6) Step B6

When there is the state transition, the TCP transmission processing unit 4 sends the control data associated with the TCP state transition (for example, the TCP state data after the update) to the control data transferring unit 6.

(7) Step B7

After that, the TCP transmission processing unit 4 generates a TCP packet and transmits through the packet output unit 2 to the counter-side host and then completes the transmission processing.

The distribution processing of the control data to the queue in the control data transferring unit 6 will be described below with reference to FIG. 4.

(1) Step C1

The TCP reception processing unit 3 or the TCP transmission processing unit 4 sends the control data to the control data transferring unit 6.

(2) Step C2

The control data transferring unit 6 checks whether or not the sent control data is the control data associated with the TCP state transition.

(3) Step C3

If the sent control data is the control data associated with the TCP state transition, the control data transferring unit 6 transfers it through the first control data priority control section 61 or second control data priority control section 62 to the high priority sub queue 63. The high priority sub queue 63 sends the transferred control data to the second control data priority control section 62 or the first control data priority control section 61.

(4) Step C4

The control data transferring unit 6 checks whether or not the sent control data is the other control data.

(5) Step C5

If the sent control data is other control data, the control data transferring unit 6 transfers it through the first control data priority control section 61 or second control data priority control section 62 to the low priority sub queue 64. The low priority sub queue 64 sends the transferred control data to the second control data priority control section 62 or the first control data priority control section 61.

At this time, if the sent control data is not the control data associated with the TCP state transition, the control data transferring unit 6 may unconditionally determine that the sent control data is other control data.

The data acquisition processing from the queue in the control data transferring unit 6 will be described below with reference to FIG. 5.

(1) Step D1

The second control data priority control section 62 or the first control data priority control section 61 monitors the high priority sub queue 63 and checks whether or not the control data has arrived at the high priority sub queue 63.

(2) Step D2

If the control data has arrived at the high priority sub queue 63, the second control data priority control section 62 or first control data priority control section 61 acquires or reads out the control data from the high priority sub queue 63.

(3) Step D3

The second control data priority control section 62 or the first control data priority control section 61 monitors the low priority sub queue 64 and checks whether or not the control data has arrived at the low priority sub queue 64.

(4) Step D4

If the control data has arrived at the low priority sub queue 64, the second control data priority control section 62 or first control data priority control section 61 acquires the control data from the low priority sub queue 64.

(5) Step D5

The second control data priority control section 62 or the first control data priority control section 61 updates the internal variable of the TCP reception processing unit 3 or the TCP transmission processing unit 4 in accordance with the acquired control data.

It should be noted that if the control data have arrived at both of the high priority sub queue 63 and the low priority sub queue 64, the second control data priority control section 62 or first control data priority control section 61 acquires the control data from the high priority sub queue 63 with priority.

The effect of this exemplary embodiment will be described below.

In this exemplary embodiment, the transmission processing and the reception processing are carried out by separate blocks, and the variables, which are required for the transmission processing and the reception processing, are transferred through the queues. Consequently, the transmission processing and the reception processing can be carried out as asynchronously operations independently of each other. In the conventional TCP stack, since the variables were complicated between the transmission side and the reception side so that the variable used in the transmission processing was updated in the reception processing, the transmission processing and the reception processing could not be divided. For this reason, when the packets are received from the counter-side host while the data are transmitted, the transmission processing could not be continued. According to this exemplary embodiment, even if the data is received from an external unit while the data is transmitted, the transmission processing can be performed at the speed higher than the conventional technique, without being influenced by it.

Also, in this exemplary embodiment, the priority levels are assigned to transfer of the control data between the TCP transmission processing unit and the TCP reception processing unit, and then the control data related to the TCP state transition is preferentially transferred. Thus, the control data associated with the establishment/disconnection processing of the session does not receive the influence of traffics (transfer amount) of the control data notified at the time of the TCP data transfer in other different session, and it is possible to carry out the establishment/disconnection of the TCP session at the speed higher than the conventional technique.

For example, it is supposed that, at the time of transfer of bidirectional data, N TCP packets of packets P1 to PN have arrived from the counter-side host. Also, it is supposed that there is a transmission request of TCP data corresponding to M TCP packets of packets Q1 to QM in the same session from an application at the same time.

Conventionally, since the TCP reception processing unit 3 and the TCP transmission processing unit 4 were not divided, the transmission processing of the packets Q1 to QM could not be carried out during the reception processing of the packets P1 to PN.

On the contrary, in this exemplary embodiment, when the packets P1 to PN have arrived, the TCP reception processing unit 3 sends N sets of [rcv_nxt], [rcv_wnd], [rcv_up] and [snd_una] updated through the TCP processing of the packets P1 to PN and the update notice of the congestion window as the control data to the control data transferring unit 6, after the TCP packet reception processing. Since those variables are the data having no relation to the TCP state transition, the control data transferring unit 6 sends through the low priority sub queue 64 to the TCP transmission processing unit and updates the variables of the TCP transmission processing unit 4. At that time, when the TCP transmission processing of the TCP data is requested by the application processing unit, the TCP transmission processing unit carries out the TCP transmission processing of the TCP data.

Also, for example, at the time of the high speed processing of the session opening/closing, when a new connection establishment request is notified from the application processing unit 5 during the transfer in the TCP data transmission/reception in one session, the transferring of the control data related to the TCP state transition associated with the connection establishment request will be delayed due to the influence of the traffic of the control data updated by the packet processing, if the TCP reception processing unit and the TCP transmission processing unit are not separated, and they are connected through the single queue, as in the conventional technique.

In this exemplary embodiment, the control data related to the TCP state transition is processed through the different route (the high priority sub queue 63). Accordingly, without any influence of the traffic related to the data transmission/reception of preset TCP sessions, the opening/closing processing of the TCP session can be carried out at the high speed, as compared with a case that the priority control is not carried out.

Second Exemplary Embodiment

Next, a second exemplary embodiment of the present invention will be described below.

Figure 6:
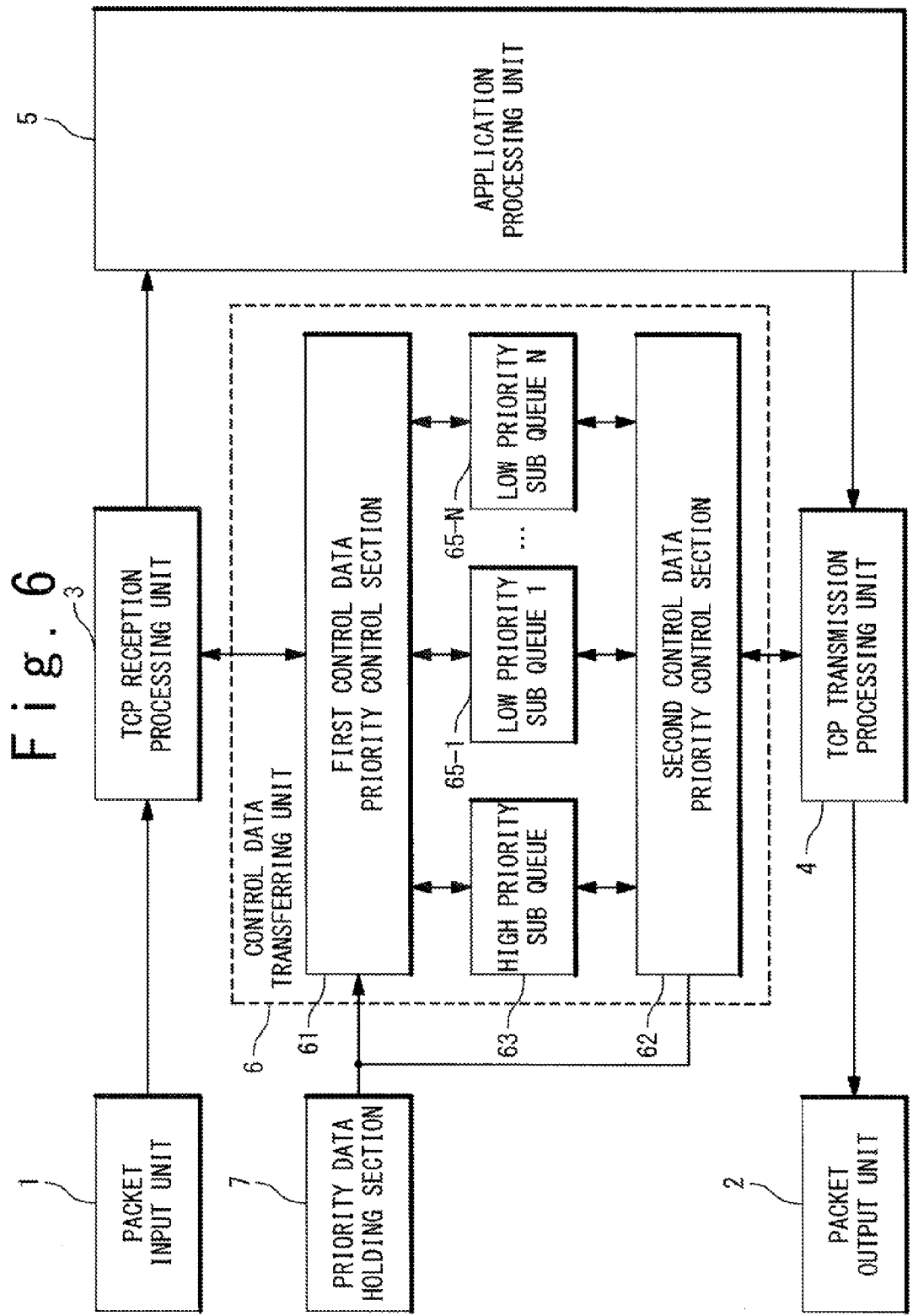
FIG. 6 is a unit diagram showing an operation for obtaining the control data from the queue, in the second exemplary embodiment of the present invention.

As shown in FIG. 6, the network protocol processing system in the second exemplary embodiment of the present invention differs from the configuration of the control data transferring unit 6 in the first exemplary embodiment shown in FIG. 1 in that the control data transferring unit 6 has N low priority queues 65 (65-*i*, i=1 to N) instead of the low priority sub queue 64 and has a priority data holding section 7.

With reference to FIG. 6, the network protocol processing system in the second exemplary embodiment of the present invention includes the packet input unit 1, the packet output unit 2, the TCP (Transmission Control Protocol) reception processing unit 3, the TCP transmission processing unit 4, the application processing unit 5, the control data transferring unit 6 and the priority data holding section 7.

The packet input unit 1, the packet output unit 2, the TCP reception processing unit 3, the TCP transmission processing unit 4 and the application processing unit 5 are basically similar to those of the first exemplary embodiment.

When receiving the control data, the control data transferring unit 6 uses the TCP session data as a key, and acquires data that indicate the priority level corresponding to the TCP session.

The control data transferring unit 6 contains the first control data priority control section 61, the second control data priority control section 62, the high priority sub queue 63 and the low priority sub queues 65 (65-*i*, i=1 to N).

The first control data priority control section 61, the second control data priority control section 62 and the high priority sub queue 63 are basically similar to those of the first exemplary embodiment.

Similarly to the high priority sub queue 63 and the low priority sub queue 64, the low priority sub queue 65 (65-*i*, i=1 to N) contains a pair of the queue (first queue) for storing the control data from the TCP reception processing unit 3 to the TCP transmission processing unit 4 and the queue (second queue) for storing the control data from the TCP transmission processing unit 4 to the TCP reception processing unit 3. Also, the low priority sub queue 65 (65-*i*, i=1 to N) stores the control data, which is transferred between the TCP reception processing unit 3 and the TCP transmission processing unit 4. The low priority sub queues 65 (65-*i*, i=1 to N) store the control data distributed on the basis of the priority levels of N kinds. In this exemplary embodiment, a priority level 1 is assumed to have the highest priority, and a priority level N is assumed to have the lowest priority. The control data, which is updated through the packet processing of the TCP session of the same priority level, is transferred through the same low priority sub queue between the TCP reception processing unit 3 and the TCP transmission processing unit 4.

It should be noted that the low priority sub queue 65 (65-*i*, i=1 to N) is not limited to storage regions separated physically, and may be a storage regions separated virtually. For example, the low priority sub queues 65 (65-*i*, i=1 to N) may be provided by virtually separating the storage region of the low priority sub queue 64 into a plurality of storage regions. In this case, the low priority sub queue 64 includes the low priority sub queues 65 (65-*i*, i=1 to N).

The priority data holding section 7 holds data indicating the priority level corresponding to the TCP session. Here, the priority data holding section 7 provides the data indicating the held priority level to the first control data priority control section 61 and the second control data priority control section 62.

The operation in the second exemplary embodiment of the present invention will be described below in detail.

Figure 2:
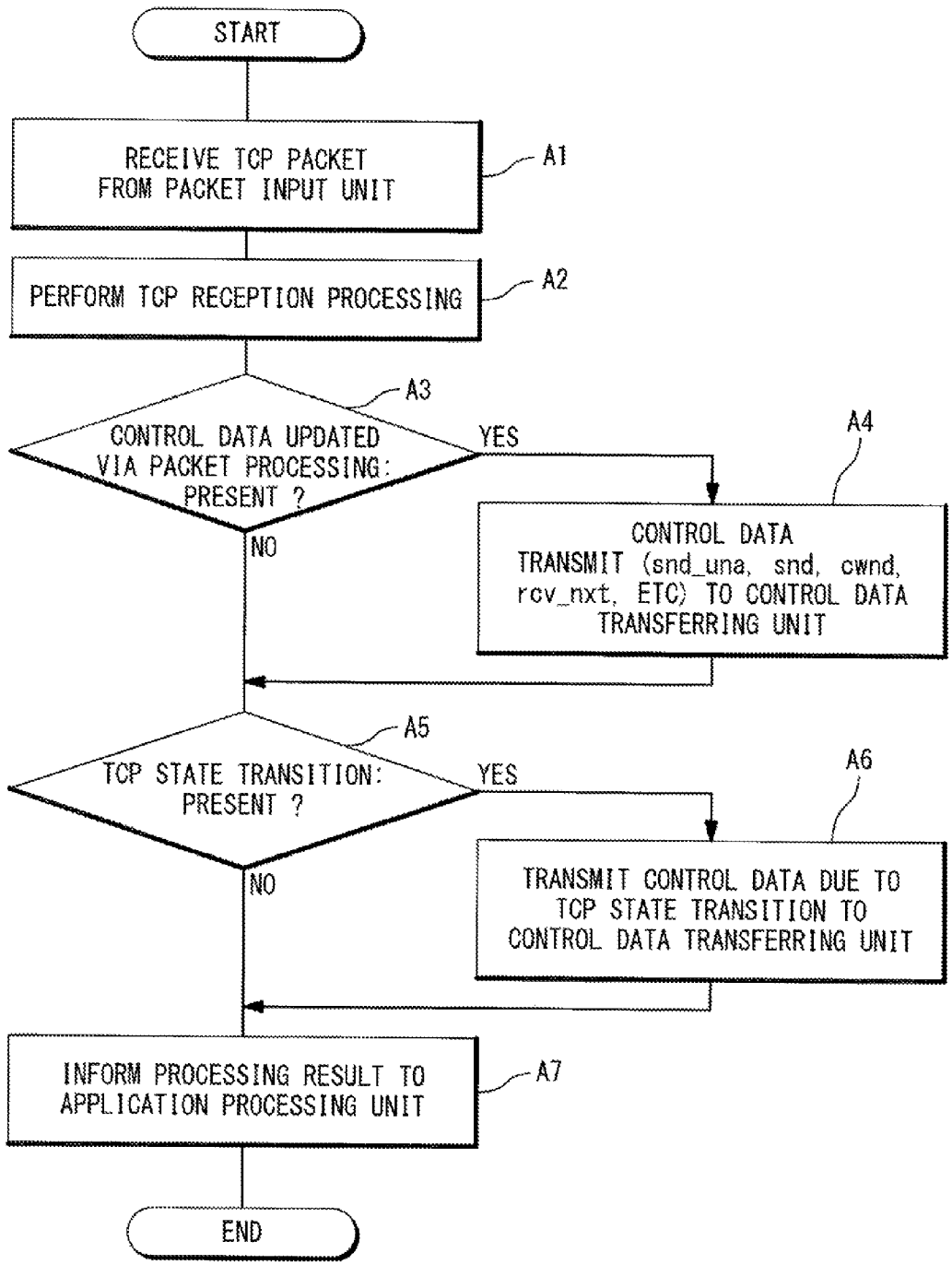
FIG. 2 is a unit diagram showing an operation of a reception processing in the first exemplary embodiment of the present invention.
Figure 3:
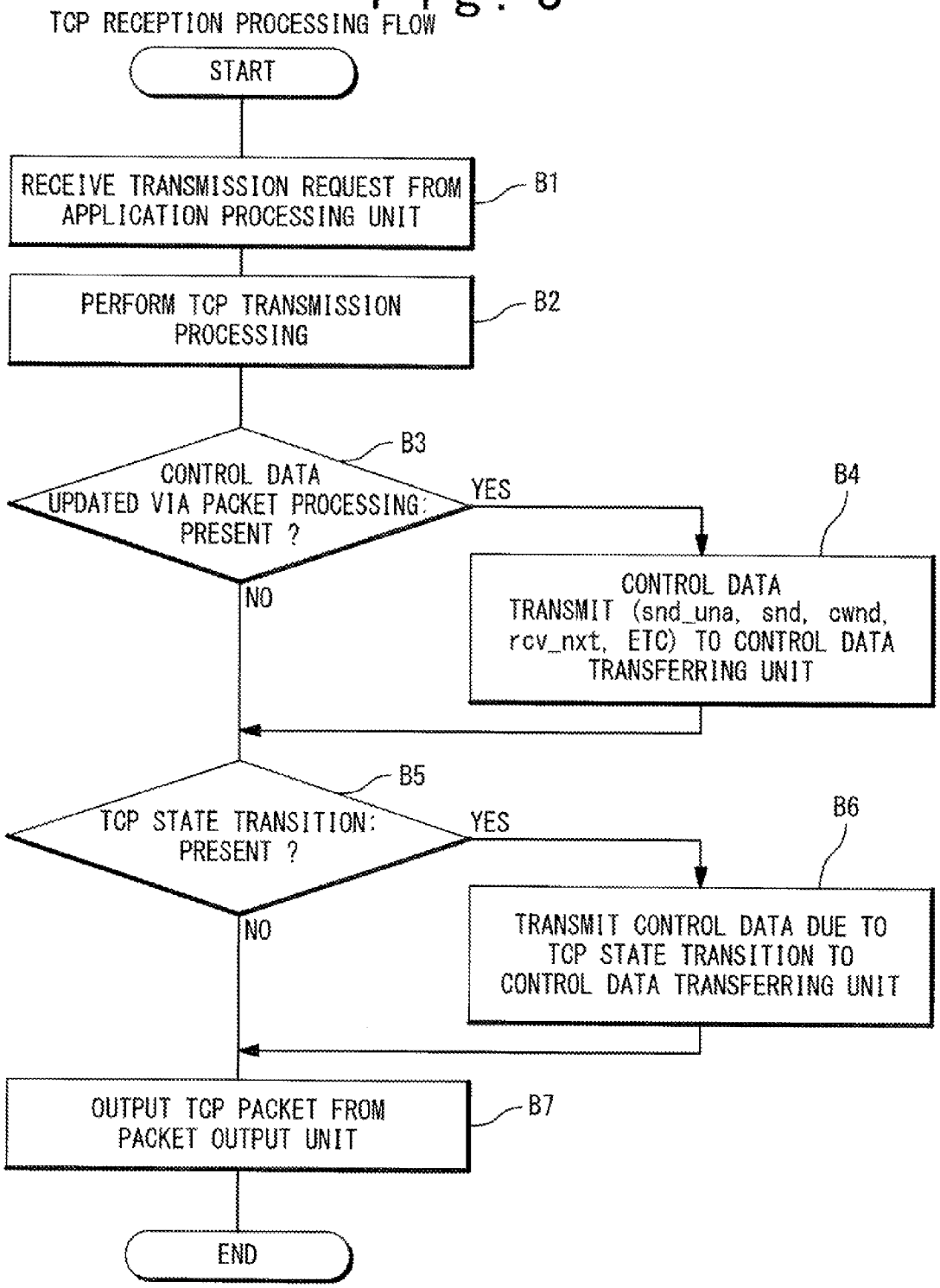
FIG. 3 is a unit diagram showing an operation of a transmission processing in the first exemplary embodiment of the present invention.

It should be noted that in this exemplary embodiment, the TCP reception processing and the TCP transmission processing are the same as the flows of FIGS. 2 and 3 in the first exemplary embodiment. Also, the step C1 to step C4 in FIG. 7 in the control data transmitting unit 7 are the same as the step C1 to step C4 in FIG. 4 in the first exemplary embodiment. The Steps D1, D2 and D5 in FIG. 8 are the same as the Steps D1, D2 and D5 in FIG. 5 in the first exemplary embodiment.

The distribution processing of the control data into the queues in the control data transferring unit 6 will be described below with reference to FIG. 7.

(1) Step C1

The TCP reception processing unit 3 or the TCP transmission processing unit 4 sends the control data to the control data transferring unit 6.

(2) Step C2

The control data transferring unit 6 checks whether or not the sent control data is the control data associated with the TCP state transition.

(3) Step C3

If the sent control data is the control data associated with the TCP state transition, the control data transferring unit 6 transfers it through the first control data priority control section 61 or second control data priority control section 62 to the high priority sub queue 63. The high priority sub queue 63 sends the transferred control data to the second control data priority control section 62 or the first control data priority control section 61.

(4) Step C4

The control data transferring unit 6 checks whether or not the sent control data is other control data.

(5) Step C6 (Change in Second Exemplary Embodiment)

In the control data transferring unit 6, the control data are distributed into the low priority sub queues related to the priority levels through the packet processing based on the priority levels related to the TCP sessions. It should be noted that if the sent control data is not the control data related to the TCP state transition, the control data transferring unit 6 uses the TCP session data as a key and acquires the data indicating the priority level of one of N kinds corresponding to the TCP session, from the priority data holding section 7. At this time, if a corresponding entry does not exist in the priority data holding section 7, the control data transferring unit 6 assigns the lowest priority level.

(6) Step C7 (Change in Second Exemplary Embodiment)

The control data transferring unit 6 distributes the control data into the low priority sub queues 65 (65-$i$, i=1 to N) corresponding to the acquired priority levels of the N kinds. The low priority sub queues 65 (65-$i$, i=1 to N) send the distributed control data to the second control data priority control section 62 or first control data priority control section 61.

At this time, if the sent control data is not the control data associated with the TCP state transition, the control data transferring unit 6 may unconditionally determine that the sent control data is the other control data.

In the first exemplary embodiment, the control data transferring unit 6 transfers all of the control data updated through the packet processing to the same low priority sub queue 64. In this exemplary embodiment, in the control data transferring unit 6, the control data are distributed into the low priority sub queues related to the priority levels through the packet processing based on the priority levels related to the TCP session. Here, if the received control data is not the control data related to the TCP state transition, the control data transferring unit 6 uses the TCP session data as a key and acquires the data indicating the priority levels of the N kinds corresponding to the TCP session, from the priority data holding section 7. Also, if the entry does not exist in the priority data holding section 7, the control data transferring unit 6 assigns the lowest priority level. In succession, the control data transferring unit 6 distributes the control data into the low priority sub queues 65 (65-$i$, i=1 to N) corresponding to the acquired priority levels of the N kinds.

The data acquisition processing from the queue in the control data transferring unit 6 will be described below with reference to FIG. 8.

(1) Step D1

The second control data priority control section 62 or the first control data priority control section 61 monitors the high priority sub queue 63 and checks whether or not the control data have arrived at the high priority sub queue 63.

(2) Step D2

If the control data have arrived at the high priority sub queue 63, the second control data priority control section 62 or first control data priority control section 61 acquires the control data of the high priority sub queue 63.

(3) Step D6 (Change in Second Exemplary Embodiment)

The second control data priority control section 62 or first control data priority control section 61 monitors the low priority sub queues 65 (65-$i$, i=1 to N) and checks whether or not the control data has arrived at the low priority sub queue 65 (65-$i$, i=1 to N) from the low priority sub queue 65-1 to the low priority sub queue 65-N.

(4) Step D7 (Change in Second Exemplary Embodiment)

If the control data have arrived at the plurality of low priority sub queues 65 (65-$i$, i=1 to N), the second control data priority control section 62 or the first control data priority control section 61 preferentially acquires the control data from the low priority sub queue whose priority level is high.

(5) Step D5

The second control data priority control section 62 or the first control data priority control section 61 updates the internal variables of the TCP reception processing unit 3 or TCP transmission processing unit 4 in accordance with the acquired control data.

It should be noted that if the control data have arrived at both of the high priority sub queue 63 and the low priority sub queues 65 (65-$i$, i=1 to N), the second control data priority control section 62 or first control data priority control section 61 stores the control data in the high priority sub queue 63 with priority.

In this exemplary embodiment, if the control data does not exist in the high priority sub queue 63 when the data is to be acquired from the queue, the second control data priority control section 62 or first control data priority control section 61 checks whether or not the control data have arrived at the low priority sub queues 65 (65-$i$, i=1 to N) in order from the low priority sub queue 65-1 to the low priority sub queue 65-N, and if the control data have arrived at the plurality of queues, this preferentially acquires the control data from the low priority sub queue with a higher priority level, and updates the variables of the internal processing.

For example, it is supposed that the I TCP sessions are established at the same time, and it is also supposed that it is shown by the priority data holding section 7 that the first TCP session of them has a priority level 1. In each of the I TCP sessions, when the data is received, the control data updated through the packet reception processing is sent from the TCP reception processing unit 3 to the control data transferring unit 6. At this time, only as for the $I^{th}$ TCP session, the control data is transferred through the low priority sub queue 65-1. The other control data are transferred through the low priority sub queue 65-N because any entry does not exist in the priority data holding section 7. In the TCP transmission processing unit 4, the control data arriving at the low priority sub queue 65-1 is processed with higher priority than the low priority sub queue 65-N. Thus, the variables of the reception processing for the $I^{th}$ TCP session are reflected to the transmission side earlier than the variables of the reception processing for the other sessions.

In this exemplary embodiment, the control data of the TCP session related to the high priority level is preferentially updated. Consequently, the session with a higher priority level is updated earlier in the update of a confirmation response number by a time of processing, as compared with the other sessions. As a result, a transmission window is set earlier in the session with the higher priority level than the other TCP sessions. Thus, a throughput increase rate becomes high as compared with the other sessions.

Third Exemplary Embodiment

The third exemplary embodiment of the present invention will be described below in detail.

In this exemplary embodiment, a network protocol processing program of the present invention will be described. The network protocol processing program instructs a computer to function as the network protocol processing system.

Figure 9:
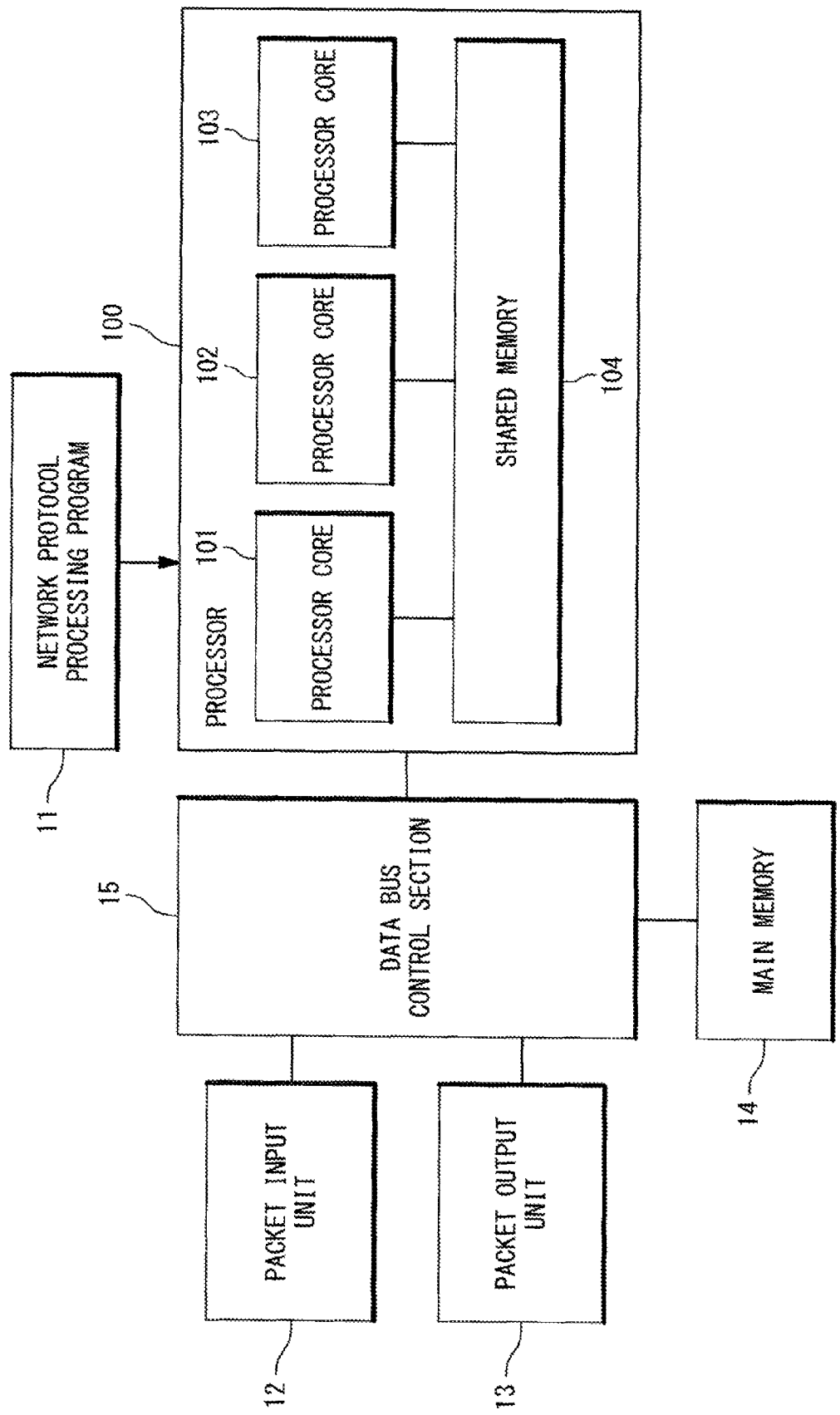
FIG. 9 is a unit diagram showing a configuration in a third exemplary embodiment of the present invention.

With reference to FIG. 9, the network protocol processing system in the third exemplary embodiment of the present invention includes a network protocol processing program 11, a packet input unit 12, a packet output unit 13, a main memory 14, a data bus control section 15 and a processor 100.

The network protocol processing program 11 is a program for controlling the operation of the processor 100. The network protocol processing program 11 is read in the processor 100. It should be noted that the network protocol processing program 11 can be stored in a storage medium.

The packet input unit 12 carries out the reception processing of the packet transmitted from the outside. It should be noted that the packet input unit 12 is equivalent to the packet input unit 1.

The packet output unit 13 carries out the transmission processing of the packet to be transmitted to the outside. It should be noted that the packet output unit 13 is equivalent to the packet output unit 2.

The main memory 14 holds a transmission/reception packet data.

The data bus control section 15 transfers the transmission/reception packet data to the main memory 14 and relays an access to the main memory 14 from the processor 100.

The processor 100 executes the network protocol processing program 11.

The processor 100 contains a processor core 101, a processor core 102, a processor core 103 and a shared memory 104.

The processor core 101, the processor core 102 and the processor core 103 can carry out reading/writing from/to the shared memory 104.

Under the control of the network protocol processing program 11, the processor 100 performs the same function as the reception processing unit of the control data transferring unit 6 and the TCP reception processing unit 3 in the first exemplary embodiment and the second exemplary embodiment, by the processor core 101 and the shared memory 104, and performs the same function as the transmission processing unit of the control data transferring unit 6 and the TCP transmission processing unit 4, by the processor core 102 and the shared memory 104, and performs the same function as the application processing unit 5 by the processor core 103.

That is, the processor core 101 performs the same function as the reception processing unit of the control data transferring unit 6 and the TCP reception processing unit 3 in the first exemplary embodiment and the second exemplary embodiment by using the shared memory 104 based on the network protocol processing program 11.

Also, the processor core 102 performs the same function as the reception processing unit of the control data transferring unit 6 and the TCP transmission processing unit 4 in the first exemplary embodiment and the second exemplary embodiment by using the shared memory 104 based on the network protocol processing program 11.

Also, the processor core 103 performs the same function as the application processing unit 5 in the first exemplary embodiment and the second exemplary embodiment by using the shared memory 104 based on the network protocol processing program 11.

Also, the shared memory 104 has storage regions corresponding to the high priority sub queue 63 and the low priority sub queue 64 or the low priority sub queues 65 (65-i, i=1 to N) in the first exemplary embodiment and the second exemplary embodiment. The control data transferred between the processor core 101 and the processor core 102 is transferred through those storage regions.

Figure 10:
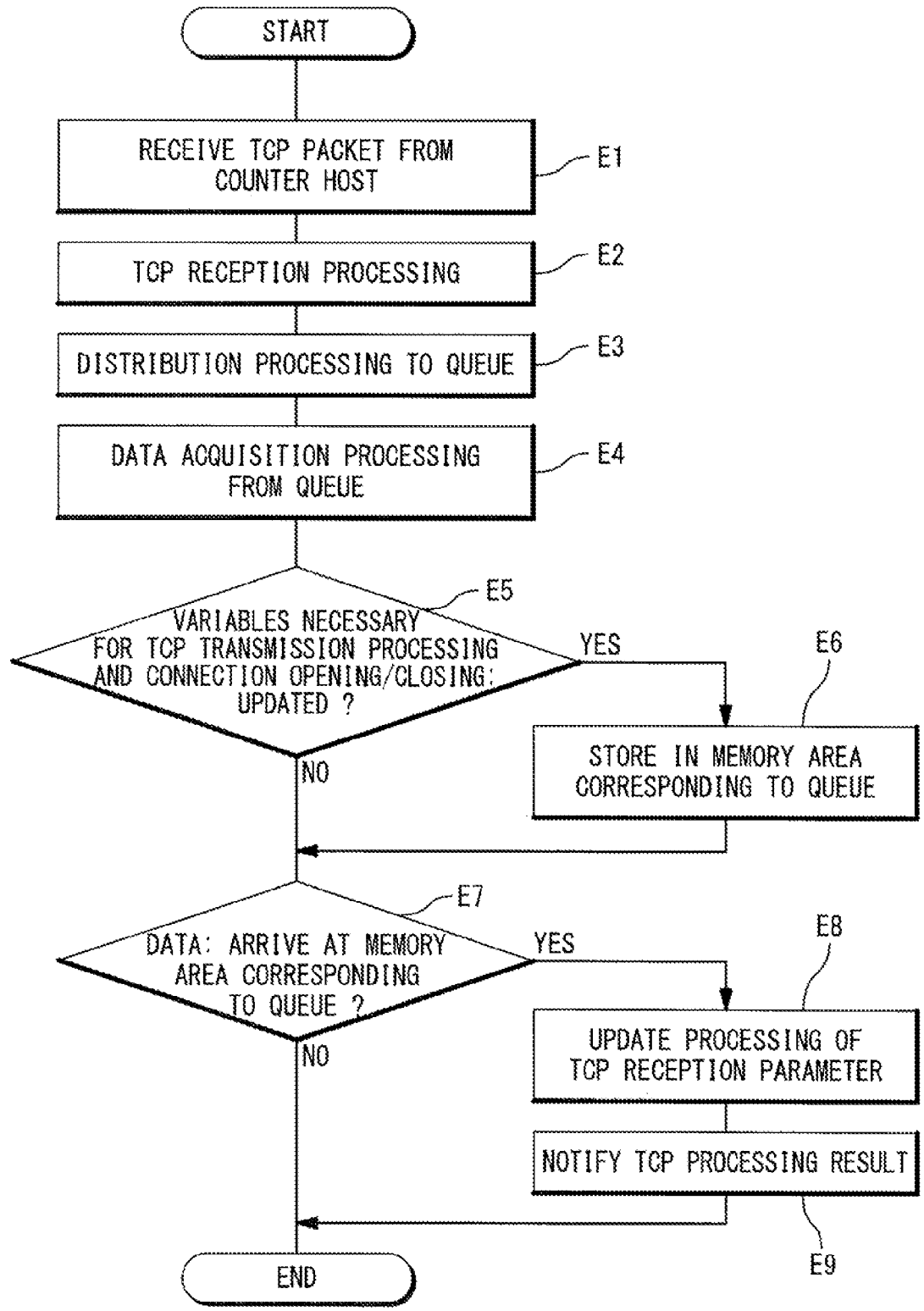
FIG. 10 is a unit diagram showing an operation at a time of reception in the third exemplary embodiment of the present invention.

The operation at the time of receiving the TCP packet in the third exemplary embodiment of the present invention will be described below with reference to FIG. 10.

(1) Step E1

The packet input unit 12 receives the TCP packet sent from a counter-side host and stores in the main memory 14 through the data bus control section 15.

(2) Step E2

The processor core 101 acquires the TCP packet stored in the main memory 14 through the data bus control section 15 and performs a process of the steps A1 to A7 in FIG. 2 as the TCP reception processing.

(3) Step E3

Figure 4:
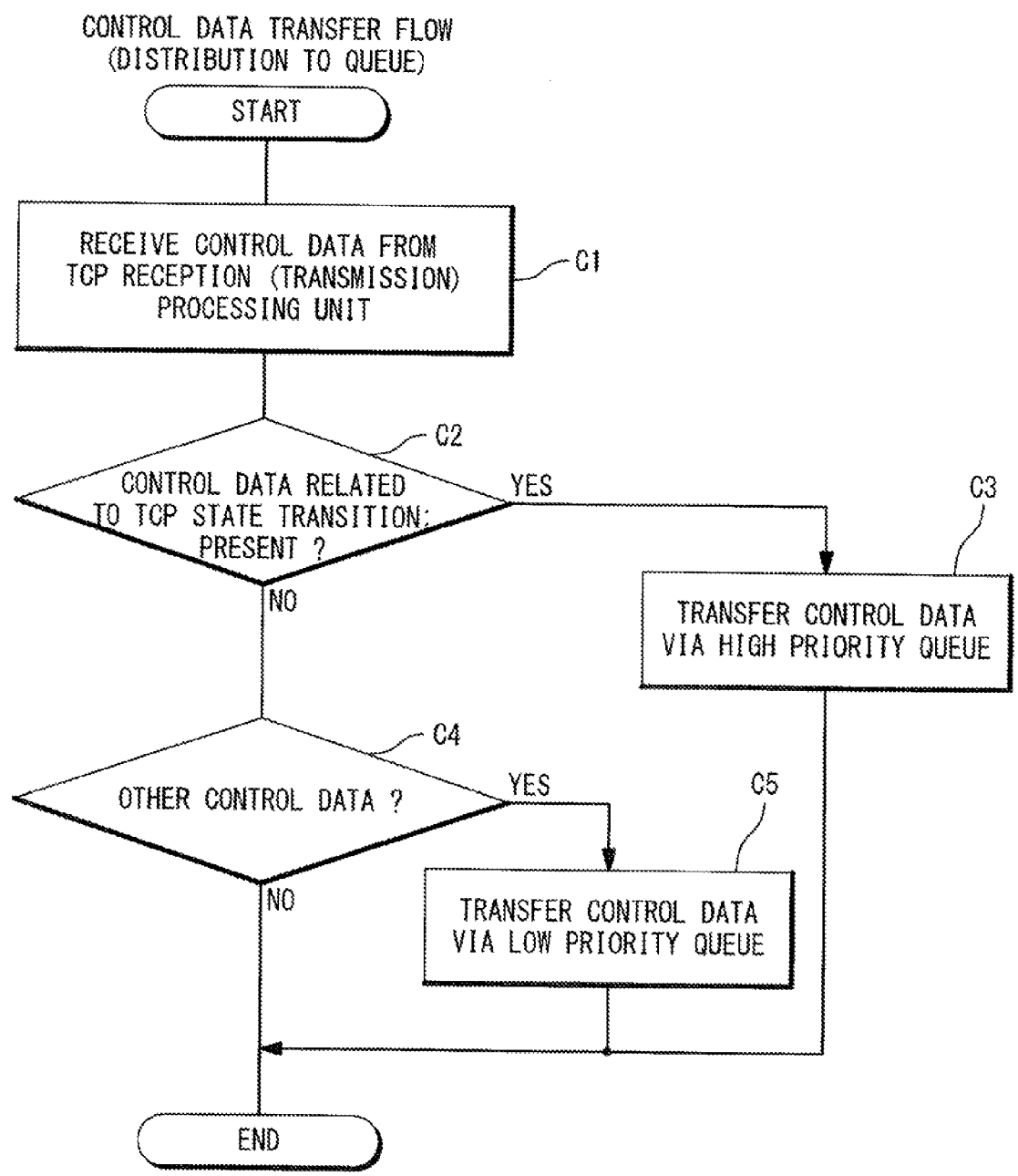
FIG. 4 is a unit diagram showing an operation of a control data transfer in the first exemplary embodiment of the present invention.
Figure 7:
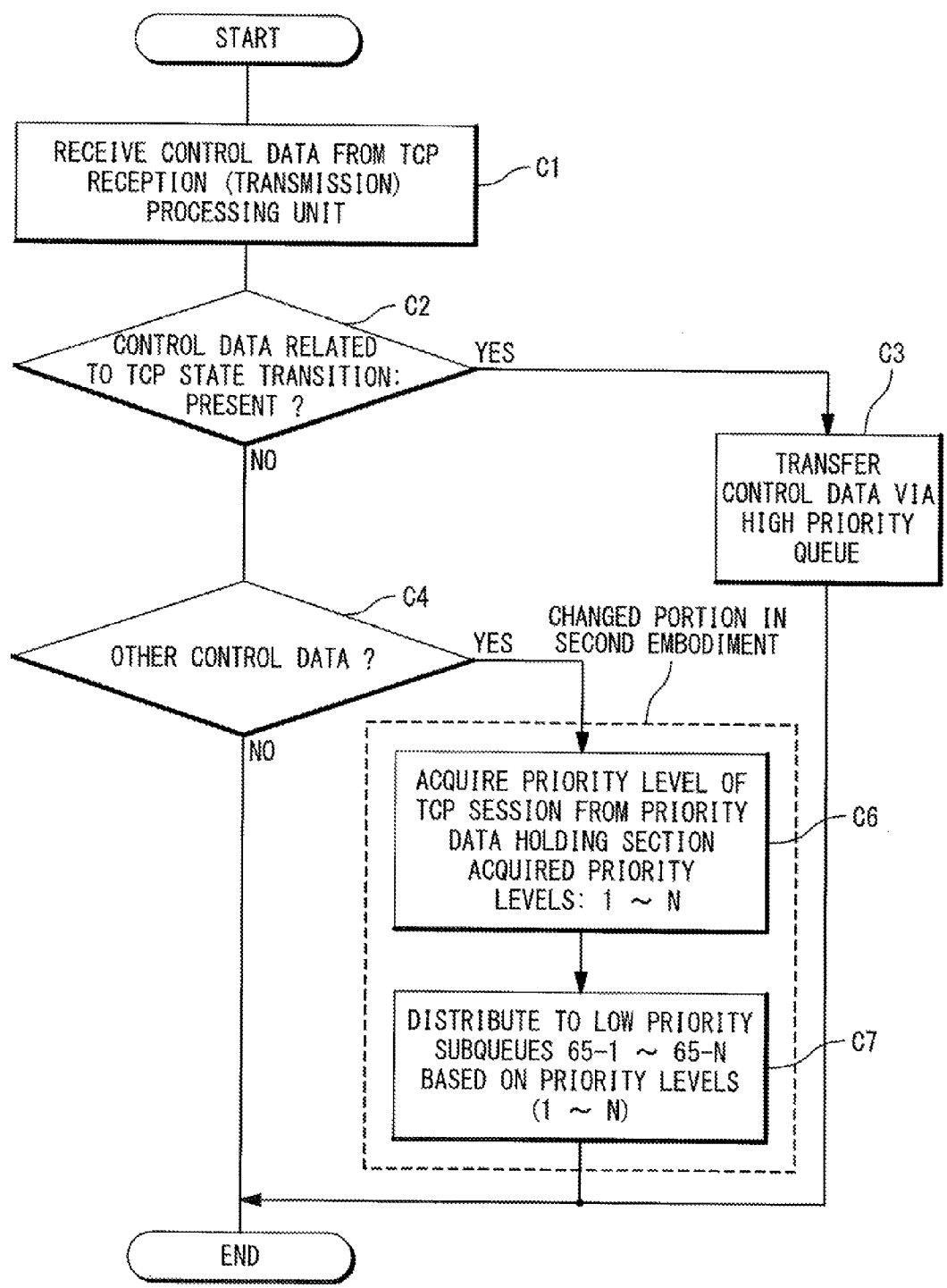
FIG. 7 is a unit diagram showing a configuration of the second exemplary embodiment of the present invention.
Figure 8:
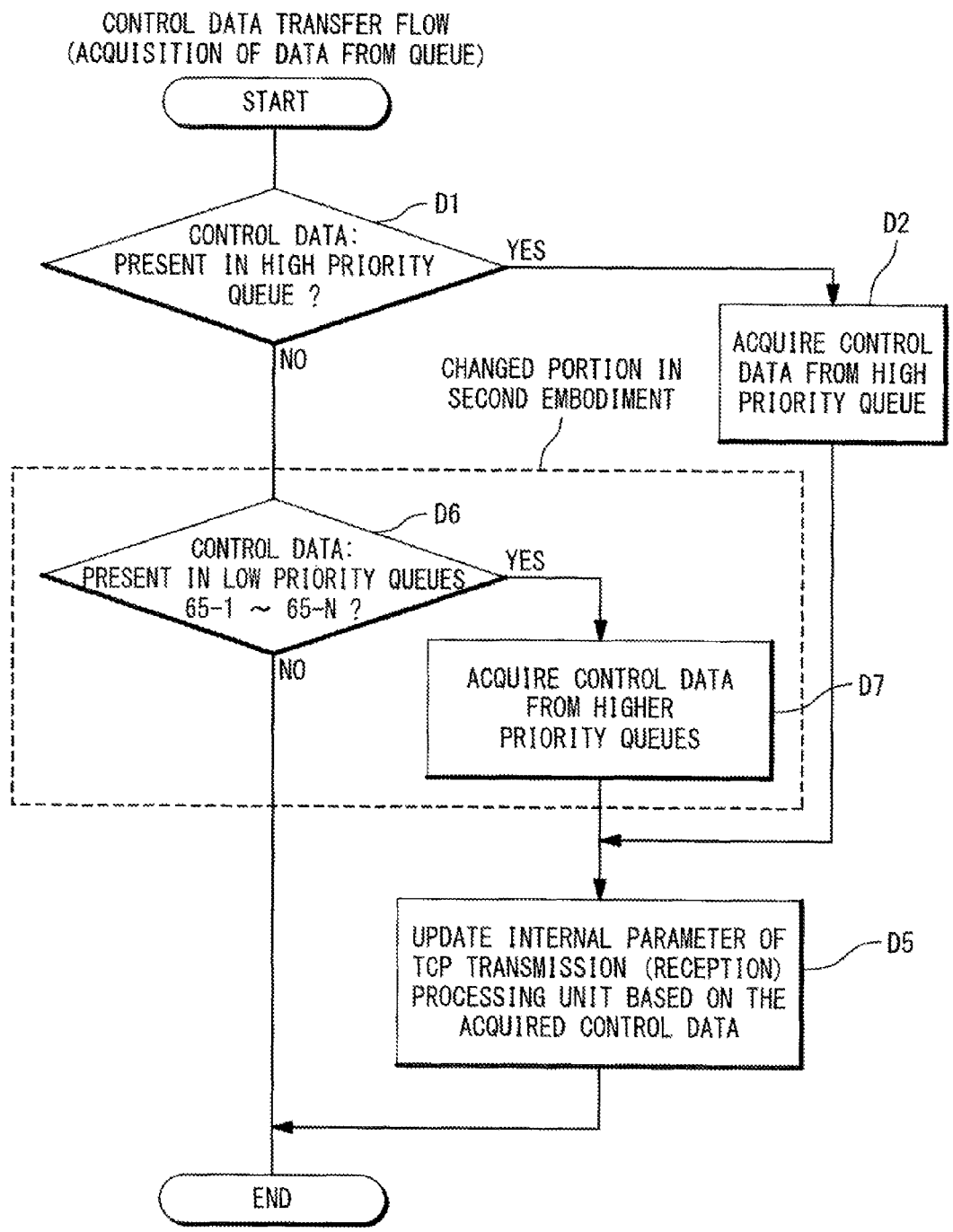
FIG. 8 is a unit diagram showing the operation in the second exemplary embodiment of the present invention.

The processor core 101 performs a process of C1 to C7 in FIG. 4 or FIG. 7 as the distribution processing into the queues.

(4) Step E4

Figure 5:
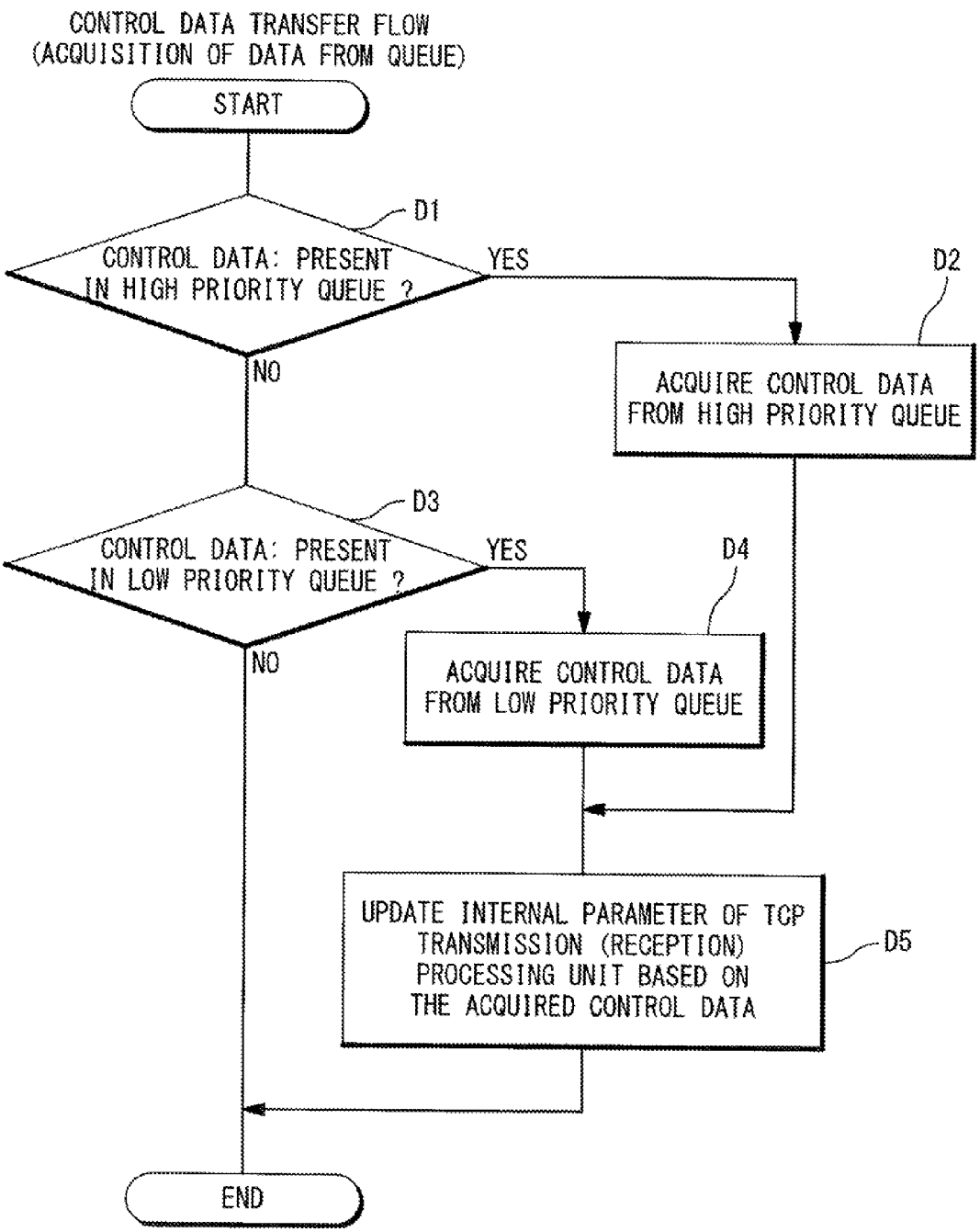
FIG. 5 is a unit diagram showing the operation of the control data transfer in the first exemplary embodiment of the present invention.

The processor core 101 performs a process of D1 to D7 in FIG. 5 or FIG. 8 as the data acquisition processing from the queues.

(5) Step E5

The processor core 101 checks whether or not the variables necessary for the TCP transmission processing or connection opening/closing have been updated, after the TCP reception processing.

(6) Step E6

If the variables necessary for the TCP transmission processing or connection opening/closing have been updated, the processor core 101 writes them in the storage region corresponding to the queue reserved in the shared memory 104.

(7) Step E7

Also, the processor core 101 checks whether or not data have arrived at the storage region corresponding to the queue of the shared memory 104.

(8) Step E8

If the data have arrived at the storage region of the shared memory 104 corresponding to the queue, the processor core 101 acquires the data and performs the update processing of a TCP reception parameter.

(9) Step E9

The processor core 101 notifies the TCP processing result to the processor core 103 and completes the reception processing.

In this exemplary embodiment, the packet input unit 12 receives the TCP packet sent from the counter-side host. The processor core 101 performs the process of the steps A1 to A7 in FIG. 2 as the TCP reception processing, the process of C1 to C7 in FIG. 4 or FIG. 7 as the distribution processing into the queues, and the process of D1 to D7 in FIG. 5 or FIG. 8 as the data acquisition processing from the queues. After the TCP reception processing, when the variables necessary for the TCP transmission processing or connection opening/closing are updated, the processor core 101 writes into the storage region corresponding to the queue reserved in the shared memory 104. Reversely, when the data have arrived at the storage regions corresponding to the queues of the shared memory 104, the processor core 101 acquires the data and performs the update processing of the TCP reception parameter. After that, the processor core 101 notifies the TCP processing result to the processor core 103 and completes the reception processing.

The operation at the time of transmitting the TCP packet in this exemplary embodiment will be described below with reference to FIG. 11.

(1) Step F1

The processor core 103 sends the TCP data to the processor core 102. That is, the processor core 102 acquires the TCP data as a sending target from the processor core 103.

(2) Step F2

The processor core 102 performs the process of the steps B1 to B7 in FIG. 3 as the TCP transmission processing.

(3) Step F3

The processor core 102 performs the process of C1 to C7 in FIG. 4 or FIG. 7 as the distribution processing into the queues.

(4) Step F4

The processor core 102 performs the process of D1 to D7 in FIG. 5 or FIG. 8 which serve as the data acquisition processing from the queues.

(5) Step F5

The processor core 102 checks whether or not the variables necessary for the TCP reception processing or connection opening/closing have been updated, after the TCP transmission processing.

(6) Step F6

If the variables necessary for the TCP reception processing or connection opening/closing have been updated, the processor core 102 writes into them the storage region corresponding to the queue reserved in the shared memory 104.

(7) Step F7

Also, the processor core 102 checks whether or not the data have arrived at the storage region corresponding to the queue of the shared memory 104.

(8) Step F8

If the data have arrived at the storage region corresponding to the queue of the shared memory 104, the processor core 102 acquires the data and performs the update processing of the TCP transmission parameter.

(9) Step F9

The processor core 102 transmits the generated TCP packet through the packet output unit 13 to the counter-side host and completes the transmission processing.

In this exemplary embodiment, the TCP data to be sent is sent from the processor core 103 to the processor core 102. The processor core 102 performs the process of the steps B1 to B7 in FIG. 3 as the TCP transmission processing, the process of C1 to C7 in FIG. 4 or FIG. 7 as the distribution processing into the queues, and the process of D1 to D7 in FIG. 5 or FIG. 8 as the data acquisition processing from the queues. The processor core 102 writes into the storage region corresponding to the queue reserved in the shared memory 104, if the variables necessary for the TCP reception processing or connection opening/closing have been updated, after the TCP transmission processing. Reversely, if the data have arrived at the storage regions corresponding to the queues of the shared memory 104, the processor core 102 acquires the data and performs the update processing of the TCP transmission parameter. After that, the processor core 102 transmits the generated TCP packet through the packet output unit 13 to the counter-side host and completes the transmission processing.

As mentioned above, in the first exemplary embodiment, the second exemplary embodiment and the third exemplary embodiment, the separation between the TCP transmission processing unit and the TCP reception processing unit and the division of the control data have been described. However, in the case of the network protocol in which the transmission window is determined based on the reception of the confirmation response, it is not limited to the TCP packet. For example, this exemplary embodiment can be applied to the network protocol such as SCTP (Stream Control Transmission Protocol), XCP (eXplicit Control Protocol) and the like.

Finally, the features of the present invention are described in detail.

The network protocol processing system of the present invention carries out the protocol processing such as the TCP (Transmission Control Protocol) protocol processing, in which the protocol processing variables of the transmission processing and the reception processing depend on each other.

The network protocol processing system contains a packet input unit, a TCP reception processing unit, a packet output unit, a TCP transmission processing unit, an application processing unit and a control data transferring unit.

The TCP reception processing unit performs the reception protocol processing on the reception packet arriving from the counter-side host through the packet input unit. The TCP reception processing unit transfers the control data, necessary for the TCP transmission processing, of the updated control data to the control data transferring unit. The TCP reception processing unit sends the TCP data, which is re-established by the reception protocol processing, to the application processing unit.

The TCP transmission processing unit performs the transmission protocol processing on the transmission data which is requested to transmit by the application processing unit. The TCP transmission processing unit transfers the control data, necessary for the TCP reception processing, of the updated control data to the control data transferring unit. The TCP transmission processing unit sends the TCP packet generated through the transmission protocol processing to the counter-side host through the packet output unit.

The control data transferring unit contains the first queue for storing the control data that is sent to the TCP transmission processing unit from the TCP reception processing unit and the second queue for storing the control data to the TCP reception processing unit from the TCP transmission processing unit.

The control data transferring unit stores the control data sent from the TCP reception processing unit in the first queue.

The TCP transmission processing unit monitors the first queue, and if the control data has been stored in the first queue, acquires the control data from the first queue and updates the variables of the TCP transmission processing in accordance with the control data.

The control data transferring unit stores the control data sent from the TCP transmission processing unit in the second queue.

The TCP reception processing unit monitors the second queue, and if the control data is stored in the second queue, acquires the control data from the second queue and updates the variables of the reception processing of the TCP in accordance with this control data.

The control data transferring unit in the network protocol processing system contains the plurality of pairs of queues, each of which is composed of the first queue and the second queue. The control data transferring unit selects one of the pairs of the queues on the basis of a kind of the control data sent to the control data transferring unit from the TCP reception processing unit or TCP transmission processing unit.

Or, the control data transferring unit in the network protocol processing system contains the pair of the high priority queue and the low priority queue, each of which includes the first queue and the second queue. This control data transferring unit stores the data related to the session establishment or session disconnection of the network session in the high priority queue, and stores the control data other than it in the low priority queue, and processes the control data stored in the high priority queue, more preferentially than the low priority queue, by acquiring the control data from the high priority queue.

Or, the control data transferring unit in the network protocol processing system contains the plurality of low priority sub queues related to the priority levels. Also, the control data transferring unit contains the priority data holding section for holding the data of the priority level corresponding to the network session.

At this time, the control data transferring unit acquires the data of the priority level corresponding to the network session from the priority data holding section in accordance with the data of the network session related to the control data sent from the TCP reception processing unit and the TCP transmission processing unit, and stores the control data in the low priority sub queue related to the priority level. The control data transferring unit preferentially processes the control data related to a higher priority level and stored in the low priority sub queue, when acquiring the control data from the sub queue.

Or, the control data transferring unit in the network protocol processing system contains the high priority queue and the plurality of low priority sub queues related to the priority levels. Also, the control data transferring unit contains the priority data holding section for holding the data of the priority level corresponding to the network session.

At this time, the control data transferring unit stores the control data related to the session establishment or session disconnection of the network session, of the control data sent from the TCP reception processing unit and the TCP transmission processing unit, in the high priority queue. Also, the control data transferring unit acquires the data indicating the priority level corresponding to the network session, from the priority data holding section in accordance with the data of the network session related to the control data, and stores the data in the low priority sub queue related to the priority level.

Also, when acquiring the control data from the queue, the control data transferring unit processes the control data stored in the high priority queue with the highest priority. Also, for the control data stored in the queue other than it, the control data transferring unit preferentially processes the control data related to the high priority level and stored in the low priority sub queue.

As mentioned above, in the present invention, in the network protocol processing system in which the variables of the protocol processing such as the TCP (Transmission Control Protocol) protocol processing in the transmission processing and the reception processing depend on each other, the transmission processing unit and reception processing unit for the network protocol are separated.

Conventionally, in the network protocol processing system in which the variables of the transmission processing and the reception processing such as the TCP protocol processing depend on each other, the asynchronous parallel processing cannot be attained between the transmission processing unit and the reception processing unit in the updated protocol processing. Also, there is a problem that the session opening/closing processing receives the influence of the data transmission/reception processing in the network of the other session.

For this reason, the network protocol processing system of the present invention has a priority control section for sorting the control data into queues of two kinds, namely, a high priority queue for transferring the control data that is processed with a high priority level between the TCP transmission processing unit and reception processing unit and a low priority queue for transferring the control data other than it. When an establishment or disconnection request of the new TCP session is issued from an application while the TCP data is transferred, a priority control section preferentially notifies the data of the establishment or disconnection request through the high priority queue and notifies the control data other than it through the low priority queue.

The first network protocol processing system of the present invention has the high priority queue for transferring the control data related to the session opening/closing between the TCP transmission processing unit and TCP reception processing unit, the low priority queue for transferring the control data updated through the packet processing that is the control data other than the above control data, and a priority control section for distributing the control data into the queues of the two kinds. Also, the priority control section preferentially acquires the control data stored in the high priority queue, of the queues of the two kinds, and updates the variables of the TCP processing of a transfer destination.

The second network protocol processing system of the present invention has a plurality of low priority sub queues instead of the low priority queue, between the TCP transmission processing unit and reception processing unit in the first network protocol processing system. Also, the priority control section selects the low priority sub queue as the distribution destination of the control data that is updated through the packet processing when the TCP data is transmitted or received, on the basis of the priority related to the TCP session.

The present invention provides the network protocol processing system, the network protocol processing method and the network protocol processing program, in which asynchronous parallel processing of the transmission processing and the reception processing is performed in the network system in which the variables of the protocol processing such as the transmission processing and reception processing of the network protocol such as the TCP depend on each other.

Also, the present invention provides the network protocol processing system, the network protocol processing method and the network protocol processing program, in which the session opening/closing processing can be executed at the high speed even during the data transmission/reception processing in the network.

Moreover, the present invention provides the network protocol processing system, the network protocol processing method and the network protocol processing program, in which the data transfer performance of the network session with a high priority level is selectively improved.

The first effect of the present invention lies in a mechanism that the asynchronous parallel processing can be carried out between the TCP transmission processing unit and the TCP reception processing unit. This is because the control data transferred between the TCP transmission processing unit and the TCP reception processing unit is notified through the queue.

The second effect of the present invention lies in a mechanism that the establishment or disconnection of the TCP session can be executed at the high speed, as compared with a case that the priority control of the control data is not performed between the TCP transmission processing unit and the TCP reception processing unit. This is because, since the notice of the establishment or disconnection of the TCP session is processed in the dedicated queue, the present invention does not receive the influence of the control data updated through the packet processing of the other TCP sessions.

The third effect of the present invention lies in the selective improvement of the throughput of the TCP session with a priority level, when the data of the plurality of sessions are transferred. This is because, since the control data related to the TCP session with the high priority is preferentially transferred between the transmission processing unit and the reception processing unit, the confirmation response (ACK) processing of the TCP session with the high priority is preferentially performed.

As mentioned above, the exemplary embodiments of the present invention have been described in detail. However, actually, the present invention is not limited to the above-mentioned exemplary embodiments. Any modification in the range without departing from the scope and spirit of the present invention is included in the present invention.

This application is the National Phase of PCT/JP2009/062086, filed Jul. 2, 2009, which claims a priority based on Japan Patent Application Number 2008-241816, and the disclosure thereof is incorporated herein by reference.

The invention claimed is:

1. A network protocol processing system comprising:
a control data transferring unit configured to perform protocol processing of reception protocol processing and transmission protocol processing, in which variables of the protocol processing used as control data for TCP transmission processing and TCP reception processing based on TCP (Transmission Control Protocol) protocol depend on each other;
a TCP reception processing unit configured to perform the reception protocol processing on reception packets which have been arrived from a counter-side host, transfer the control data, which is used in the TCP transmission processing, of the control data updated through the reception protocol processing to said control data transferring unit, and transfer TCP data re-configured through the reception protocol processing to an application processing unit; and
a TCP transmission processing unit configured to perform the transmission protocol processing on transmission data for which a transmission request is issued from said application processing unit, transfer the control data, which is used in the TCP reception processing, of the control data updated through the transmission protocol processing to said control data transferring unit, and transfer a TCP packet generated through the transmission protocol processing to said counter-side host,
wherein said control data transferring unit stores the control data sent from said TCP reception processing unit in a first queue section, and
stores the control data sent from said TCP transmission processing unit in a second queue section,
wherein said TCP transmission processing unit monitors said first queue, and acquires the control data from said first queue section to update the variables of the TCP transmission processing, when the control data is stored in said first queue, and
monitors said second queue, and acquires the control data from said second queue section to update the variables of the TCP reception processing when the control data is stored in said second queue,
wherein said control data transferring unit comprises:
a high priority queue which comprises a pair of a queue of said first queue section and a queue of said second queue section; and a low priority queue which comprises a pair of another queue of said first queue section and another queue of said second queue section, stores the control data having a first kind related to session establishment and session disconnection of each of network sessions and sent from either of said TCP reception processing unit or said TCP transmission processing unit, in said high priority queue, stores the control data of a second kind other than the first kind sent from either of said TCP reception processing unit or said TCP transmission processing unit in said low priority queue, and processes the control data stored in said high priority queue more preferentially than the control data stored in said low priority queue, when the control data are to be acquired from said high priority queue and said low priority queue.

2. The network protocol processing system according to claim 1, wherein said control data transferring unit further selects one from among a plurality of pairs of a queue of said first queue section and a queue of said second queue section based on a kind of the control data sent to said control data transferring unit from either of said TCP reception processing unit or and said TCP transmission processing unit.

3. The network protocol processing system according to claim 1, wherein said control data transferring unit comprises:

a high priority queue which comprises a pair of a queue of said first queue section and a queue of said second queue section;

a plurality of low priority sub queues, each of which comprises a pair of a sub queue of said first queue section and a sub queue of said second queue section, the pairs assigned with priority levels corresponding to network sessions; and a priority data holding section configured to hold data of the priority levels corresponding to network sessions, stores in said high priority queue, the control data having a first kind associated with session establishment and the session disconnection of each of said network sessions and sent from said TCP reception processing unit or said TCP transmission processing unit, acquires the data of the priority level corresponding to one of said network sessions from said priority data holding section based on data of said network session sent from said TCP reception processing unit or said TCP transmission processing unit, stores the control data of a second kind different from the first kind in one low priority sub queue, related to the acquired priority level, of said plurality of low priority sub queues, processes the control data of the first kind stored in said high priority queue more preferentially than the control data stored in said plurality of low priority sub queues, and processes the control data of the second kind stored in said plurality of low priority sub queues in order of higher priority level.

4. A network protocol processing method which is implemented on a computer connected with a counter-side host, said network protocol processing method comprising:

performing protocol processing of reception protocol processing and transmission protocol processing, in which variables of the protocol processing used as control data for each of TCP transmission processing and TCP reception processing based on TCP (Transmission Control Protocol) protocol depend on each other;

performing the reception protocol processing on reception packets which have been arrived from said counter-side host, storing in a first queue section, the control data, which is used in the TCP transmission processing, of the control data updated through the reception protocol processing, and providing TCP data re-configured through the reception protocol processing to an application side;

performing the transmission protocol processing on transmission data for which a transmission request is issued from said application side, storing in a second queue section, the control data, which is used in the TCP reception processing, of the control data updated through the transmission protocol processing, and sending a TCP packet generated through the transmission protocol processing to said counter-side host;

monitoring said first queue, and acquiring the control data from said first queue section to update the variables of the TCP transmission processing, when the control data is stored in said first queue section;

monitoring said second queue, and acquiring the control data from said second queue section to update the variables of the TCP reception processing when the control data is stored in said second queue section;

storing the control data having a first kind related to session establishment and session disconnection of each of network sessions and sent from either of said TCP reception processing unit or said TCP transmission processing unit, in a high priority queue which comprises a pair of a queue of said first queue section and a queue of said second queue section, and the control data of a second kind other than the first kind sent in either of said TCP reception processing or said TCP transmission processing in a low priority queue which comprises a pair of another queue of said first queue section and another queue of said second queue section; and processing the control data stored in said high priority queue more preferentially than the control data stored in said low priority queue, when the control data are to be acquired from said high priority queue and said low priority queue.

5. The network protocol processing method according to claim 4, further comprising:

selecting one of a plurality of pairs of a queue of said first queue section and a queue of said second queue section, based on a kind of the control data used in either of said TCP reception processing or said TCP transmission processing.

6. The network protocol processing method according to claim 4, further comprises:

holding data of priority levels corresponding to network sessions;

storing the control data having a first kind associated with session establishment and the session disconnection of each of network sessions and used in said TCP reception processing or said TCP transmission processing in a high priority queue which comprises a pair of a queue of said first queue section and a queue of said second queue section;

acquiring the data of the priority level corresponding to one of said network sessions, from the held data of the priority levels corresponding to said network sessions, based on data of said network session sent in said TCP reception processing or said TCP transmission processing;

storing the sent control data of a second kind different from the first kind in one low priority sub queue related to the acquired priority level, of said plurality of low priority sub queues, each of which comprises a pair of a sub queue of said first queue section and a sub queue of said second queue section, the pairs assigned with the priority levels;

processing the control data of the first kind stored in said high priority queue more preferentially than the control data stored in said plurality of low priority sub queues, and processing the control data stored in said plurality of low priority sub queues in order of higher priority level, when the control data are to be acquired from said plurality of low priority sub queues.

7. A non-transitory computer-readable recording medium in which a computer-executable program code is stored to attain a network protocol processing method which is implemented on a computer connected with a counter-side host, said network protocol processing method comprises:

performing protocol processing of reception protocol processing and transmission protocol processing, in which variables of the protocol processing used as control data for each of TCP transmission processing and TCP reception processing based on TCP (Transmission Control Protocol) protocol depend on each other;

performing the reception protocol processing on reception packets which have been arrived from said counter-side host, storing in a first queue section, the control data, which is used in the TCP transmission processing, of the control data updated through the reception protocol processing, and providing TCP data re-configured through the reception protocol processing to an application side;

performing the transmission protocol processing on transmission data for which a transmission request is issued from said application side, storing in a second queue section, the control data, which is used in the TCP reception processing, of the control data updated through the transmission protocol processing, and sending the TCP packet generated through the transmission protocol processing to said counter-side host;

monitoring said first queue, and acquiring the control data from said first queue section to update the variables of the TCP transmission processing, when the control data is stored in said first queue section;

monitoring said second queue, and acquiring the control data from said second queue section to update the variables of the TCP reception processing when the control data is stored in said second queue section;

storing the control data having a first kind related to session establishment and session disconnection of each of network sessions and sent from either of said TCP reception processing or said TCP transmission processing, in a high priority queue which comprises a pair of a queue of said first queue section and a queue of said second queue section, and the control data of a second kind other than the first kind sent in either of said TCP reception processing or said TCP transmission processing in a low priority queue which comprises a pair of another queue of said first queue section and another queue of said second queue section; and processing the control data stored in said high priority queue more preferentially than the control data stored in said low priority queue, when the control data are to be acquired from said high priority queue and said low priority queue.

8. The non-transitory computer-readable recording medium according to claim 7, in which the program is stored for making the computer further execute:

selecting one of a plurality of pairs of a queue of said first queue section and a queue of said second queue section, based on a kind of the control data used in either of said TCP reception processing or and said TCP transmission processing.

9. The non-transitory computer-readable recording medium according to claim 7 wherein said network protocol processing method further comprises:

holding data of priority levels corresponding to network sessions;

storing the control data having a first kind associated with session establishment and the session disconnection of each of network sessions and used in said TCP reception processing or said TCP transmission processing in a high priority queue which comprises a pair of a queue of said first queue section and a queue of said second queue section;

acquiring the data of the priority level corresponding to one of said network sessions, from the held data of the priority levels corresponding to said network sessions, based on data of said network session sent in said TCP reception processing or said TCP transmission processing;

storing the control data of a second kind different from the first kind in one low priority sub queue related to the acquired priority level, of said plurality of low priority sub queues, each of which comprises a pair of a sub queue of said first queue section and a sub queue of said second queue section, the pairs assigned with the priority levels;

processing the control data of the first kind stored in said high priority queue more preferentially than the control data stored in said plurality of low priority sub queues, and processing the control data stored in said plurality of low priority sub queues in order of higher priority level, when the control data are to be acquired from said plurality of low priority sub queues.

* * * * *